(12) United States Patent
Baca

(10) Patent No.: US 9,704,632 B2
(45) Date of Patent: Jul. 11, 2017

(54) LOW PROFILE MAGNETIC MOUNT FOR ELECTRONIC DISPLAY DEVICES

(71) Applicant: Alejandro Baca, Canyon Country, CA (US)

(72) Inventor: Alejandro Baca, Canyon Country, CA (US)

(73) Assignee: 1LSS, Inc., Canyon Country, CA (US)

( * ) Notice: Subject to any disclaimer, the term of this patent is extended or adjusted under 35 U.S.C. 154(b) by 0 days.

(21) Appl. No.: 14/288,243

(22) Filed: May 27, 2014

(65) Prior Publication Data

US 2014/0347795 A1 Nov. 27, 2014

Related U.S. Application Data

(60) Provisional application No. 61/827,700, filed on May 27, 2013.

(51) Int. Cl.
*H01F 7/02* (2006.01)
*F16M 13/00* (2006.01)
(Continued)

(52) U.S. Cl.
CPC ........... *H01F 7/0252* (2013.01); *F16M 13/00* (2013.01); *G06F 1/1601* (2013.01);
(Continued)

(58) Field of Classification Search
CPC ... H01F 7/0252; G09F 7/18; G09F 2007/1852
(Continued)

(56) References Cited

U.S. PATENT DOCUMENTS 3,082,896 A * 3/1963 Mosher .................. B65D 81/02
217/53
4,287,676 A * 9/1981 Weinhaus ................. G09F 7/18
248/206.5
(Continued)

FOREIGN PATENT DOCUMENTS

| KR | 10-2012-0076404 | 7/2012 |
| KR | 10-2013-0041377 | 4/2013 |
| WO | WO 2014/193853 | 12/2014 |

OTHER PUBLICATIONS

International Search Report and Written Opinion for International Application No. PCT/US2014/039616, mailed Oct. 15, 2014, 16 pages.

*Primary Examiner* — Ramon M Barrera
(74) *Attorney, Agent, or Firm* — Cooley LLP

(57) ABSTRACT

A mounting mechanism for mounting an electronic device, such as an electronic display device, to various surfaces, including ferrous surfaces. The mounting mechanism may include friction pads for attachment to the electronic display device. In one implementation a plurality of magnets are embedded within the friction pads. Alternatively, the magnets may be directly attached to the electronic display device and covered by the friction pads. When the mounting mechanism is used to mount the electronic device to a ferrous surface, the magnets and the friction pad respectively provide magnetic and frictional forces so as to enable secure mounting of the electronic display device to the ferrous surface. The mounting mechanism may also include a frame disposed to be affixed to a non-ferrous surface. The frame defines a ferrous surface to which the electronic display device may then be mounted using various configurations of magnets and friction pads.

13 Claims, 12 Drawing Sheets

(51) Int. Cl.
  *G06F 1/16*   (2006.01)
  *G09F 7/18*   (2006.01)
  *G09F 9/30*   (2006.01)
(52) U.S. Cl.
  CPC .......... *G06F 1/1626* (2013.01); *G06F 1/1656* (2013.01); *G09F 7/18* (2013.01); *G06F 2200/1612* (2013.01); *G06F 2200/1613* (2013.01); *G09F 9/30* (2013.01); *G09F 2007/1852* (2013.01); *Y10T 24/32* (2015.01)
(58) Field of Classification Search
  USPC ........................................................ 335/285
  See application file for complete search history.

(56) References Cited

U.S. PATENT DOCUMENTS

| | | |
|---|---|---|
| 7,431,251 B2 | 10/2008 | Carnevali |
| 8,242,868 B2 | 8/2012 | Lauder et al. |
| 2007/0003739 A1* | 1/2007 | Peterson .................. B32B 1/00 428/174 |
| 2014/0113044 A1* | 4/2014 | McIntire ............. A47J 37/0786 426/416 |

* cited by examiner

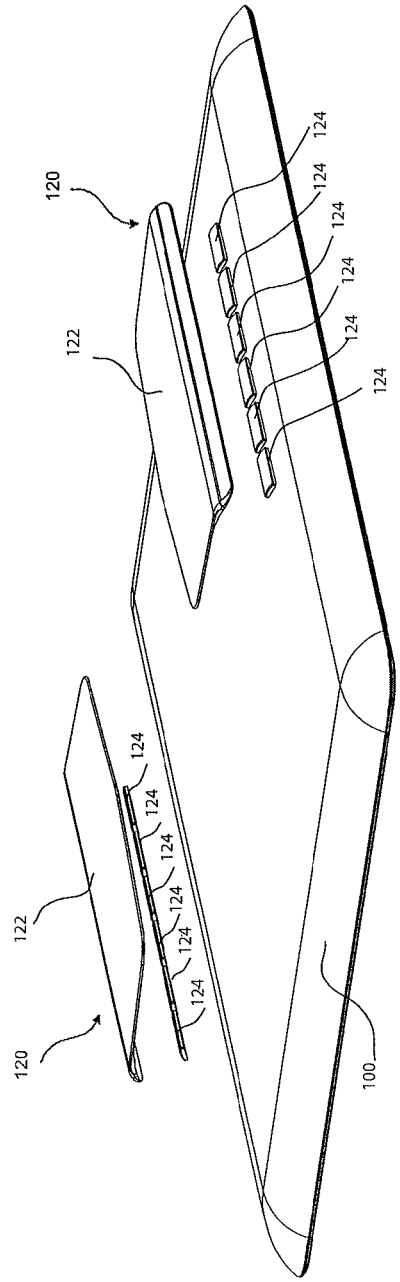
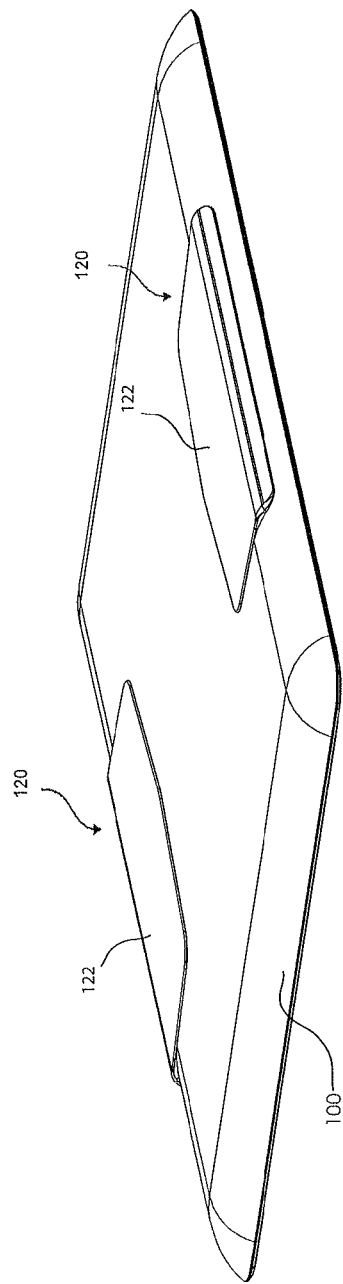

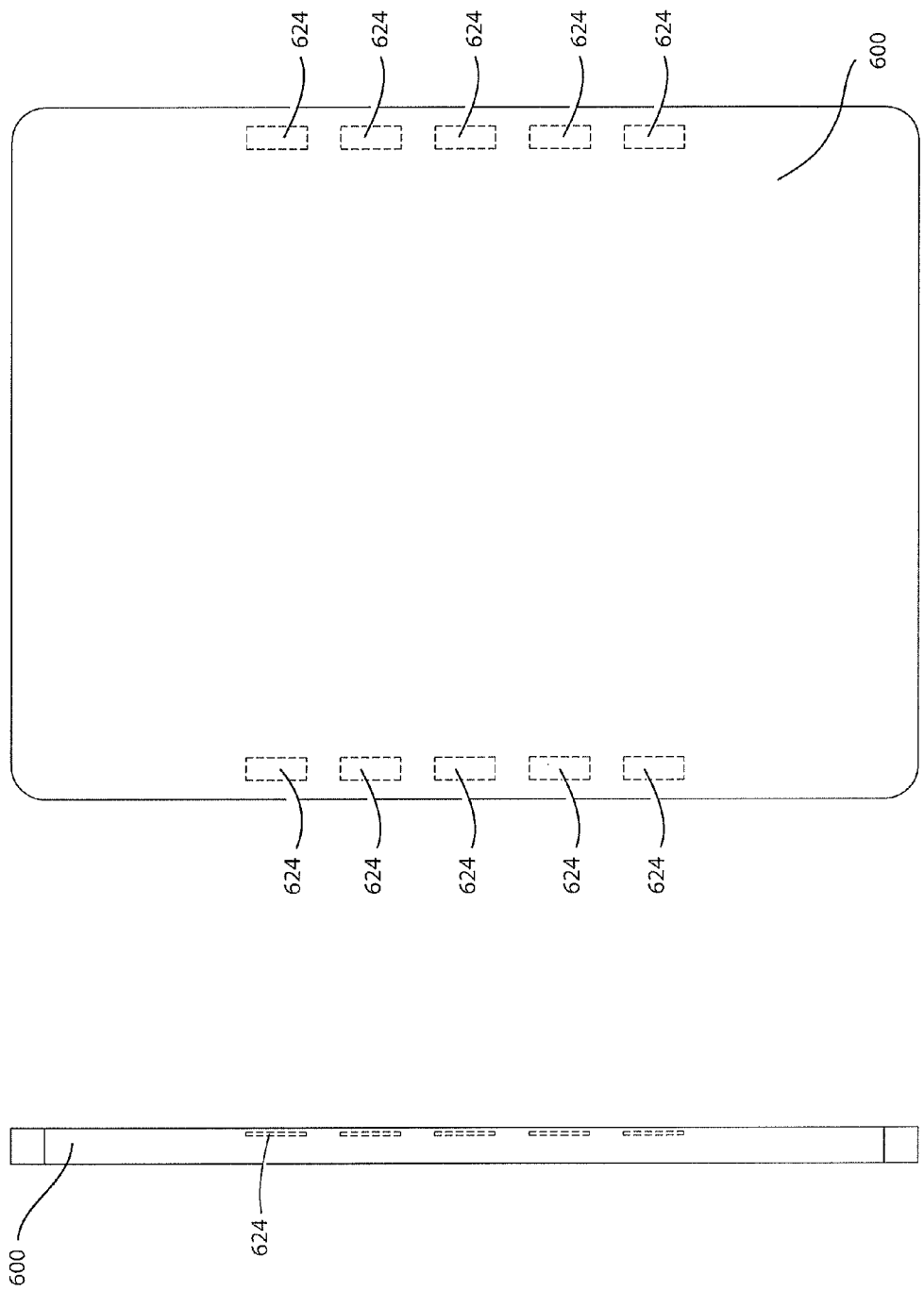

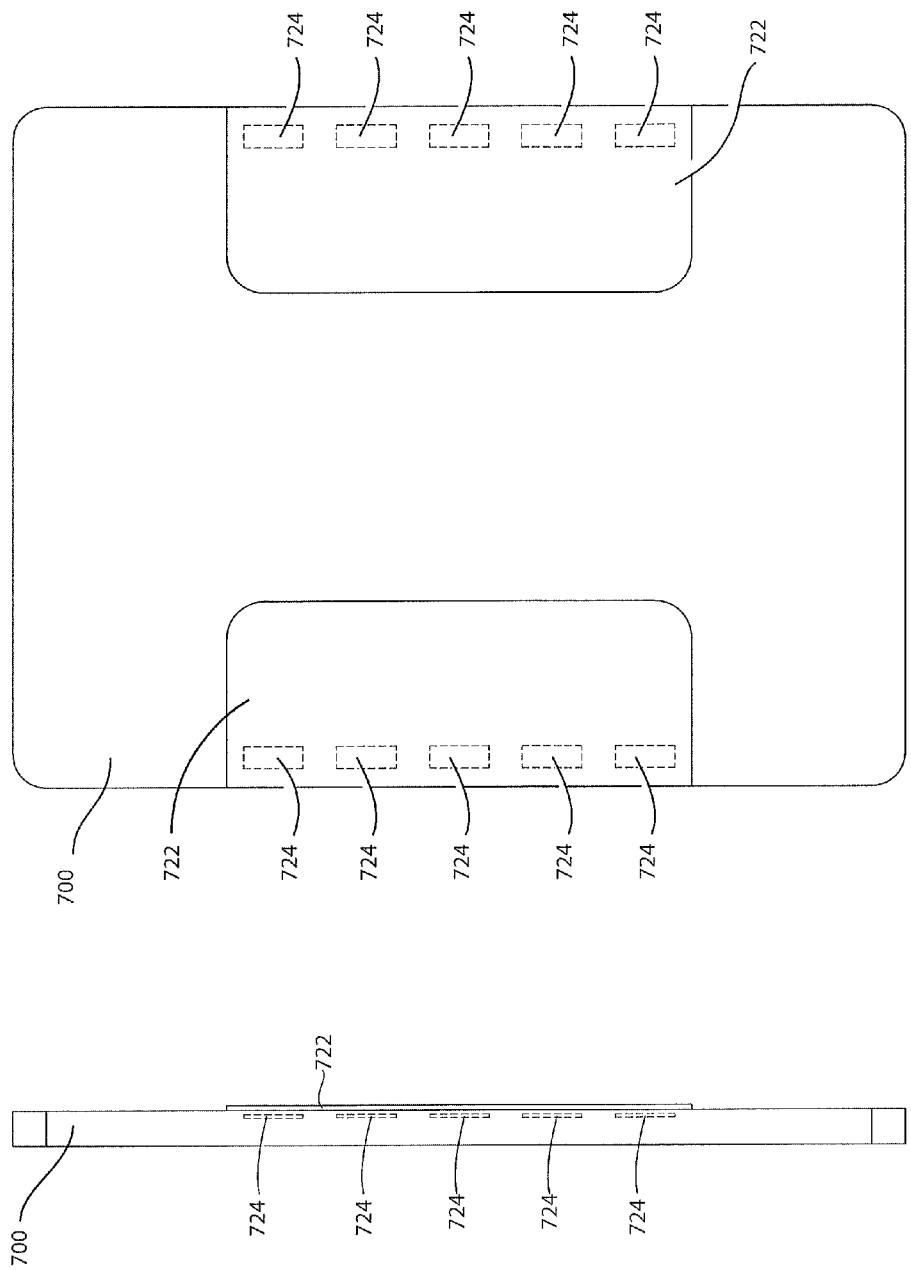

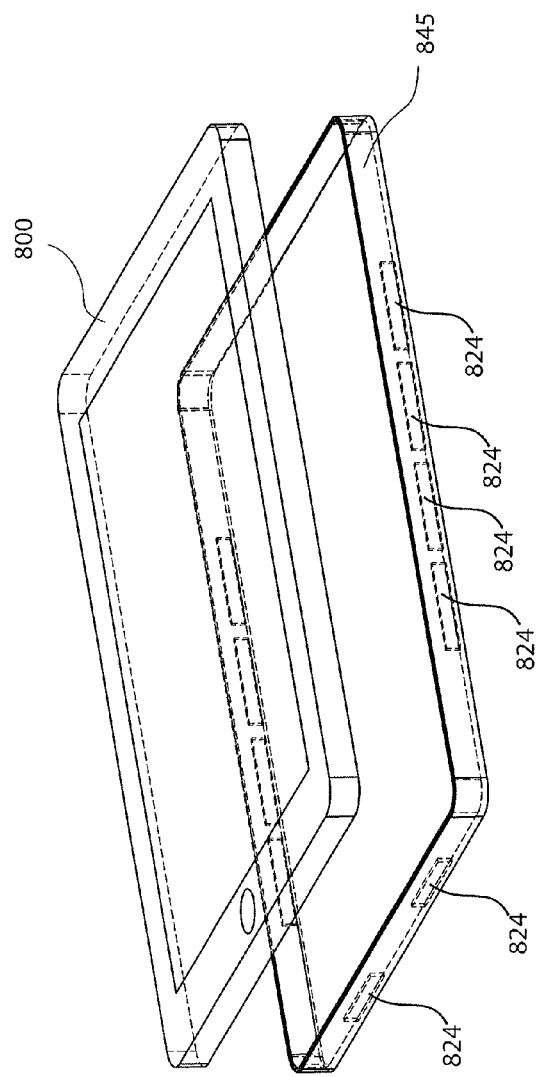
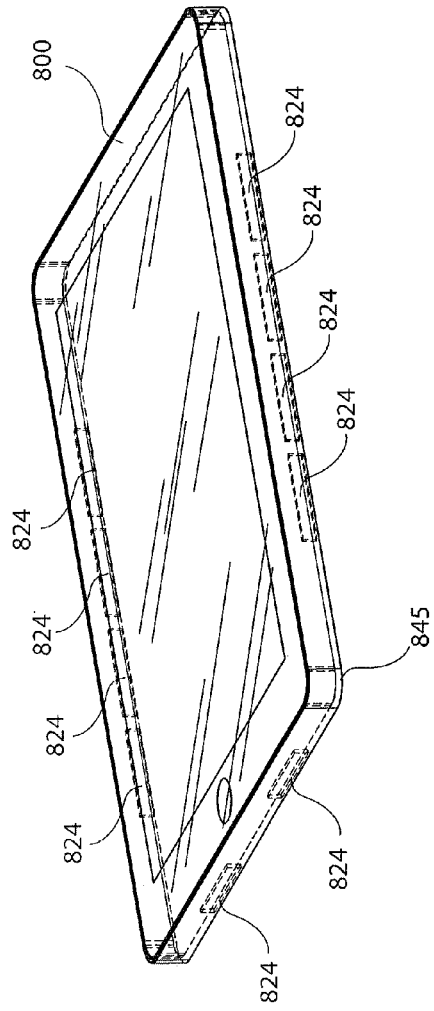

LOW PROFILE MAGNETIC MOUNT FOR ELECTRONIC DISPLAY DEVICES

CROSS REFERENCES TO RELATED APPLICATIONS

This application claims priority to and the benefit of U.S. Provisional Patent Application No. 61/827,700, entitled "Low Profile Magnetic Mount for Electronic Display Devices," filed May 27, 2013, the disclosure of which is incorporated herein by reference in its entirety.

BACKGROUND

The embodiments described herein relate generally to the field of electronic display device mounts, and more specifically, to a mounting system that can be used to easily mount and unmount electronic display devices to various surfaces.

There are many known mounting systems for various electronic display devices. These electronic display devices include, but are not limited to tablet computers, smartphones, televisions, and LCD displays. As technology progresses, these devices are becoming thinner and lighter. Along with this, the importance for low profile mounting mechanisms have become more valuable. Current mounting mechanisms can be cumbersome, bulky, and can add considerable weight to the electronic display device. Often, the mounting mechanism that attaches to the desired mounting surface is bulky and aesthetically unpleasing.

Thus, a need exists to provide a mounting mechanism for mounting electronic display devices to amounting surface without adding significant bulk to the electronic display device or the mounting surface.

SUMMARY

The disclosure generally relates to a mounting mechanism for mounting an electronic device, such as an electronic display device, to various surfaces, including ferrous surfaces. The mounting mechanism may include friction pads for attachment to the electronic display device. In one implementation a plurality of magnets are embedded within the friction pads. Alternatively, the magnets may be directly attached to the electronic display device and covered by the friction pads. When the mounting mechanism is used to mount the electronic device to a ferrous surface, the magnets and the friction pad respectively provide magnetic and frictional forces so as to enable secure mounting of the electronic display device to the ferrous surface.

The electronic device may also be mounted to a non-ferrous surface. In this case the mounting mechanism includes a frame, such as a metal frame, which is affixed to the non-ferrous surface using conventional techniques. The metal frame defines a ferrous surface to which the electronic display device may then be mounted using various configurations of magnets and friction pads described hereinafter.

It is a feature of the disclosed mounting device that a user may easily dismount the electronic display device from a surface to which it had been mounted. Moreover, the mounting mechanism advantageously does not add significant thickness or weight to the electronic display device or the mounting surface.

In one particular aspect the disclosure relates to a mounting mechanism for mounting an electronic device to a ferrous surface. The mounting mechanism may include a plurality of magnets attached to a surface of the electronic device. The mounting mechanism may further include a high friction pad structure having an inner surface for attachment to the surface of the electronic device. The high friction pad structure may cover the plurality of magnets and have an outer surface which contacts the ferrous surface when the electronic device is mounted to the ferrous surface. The mounting mechanism may further include a frame element for attachment to a non-ferrous surface, the frame element defining the ferrous surface.

In another aspect the disclosure relates to a mounting mechanism which includes a high friction pad structure having an inner surface for attachment to a surface of an electronic device. The mounting mechanism may further include a plurality of magnets embedded within the high friction pad structure wherein the high friction pad structure includes an outer surface which contacts the ferrous surface when the electronic device is mounted to the ferrous surface. The mounting mechanism may further include a frame element attached to a non-ferrous surface, the frame element defining the ferrous surface.

The disclosure also pertains to an electronic device configured to be mounted to a ferrous surface. The electronic device includes a housing having a substantially planar surface characterized by high friction properties. The electronic device further includes a plurality of magnets embedded within the housing. The substantially planar surface contacts the ferrous surface when the electronic device is mounted to the ferrous surface. The mounting mechanism may further include a frame element for attachment to a non-ferrous surface, the frame element defining the ferrous surface.

In yet a further aspect the disclosure relates to a mounting mechanism for securing an electronic device to a ferrous surface. The mounting mechanism includes a plurality of magnets embedded within the electronic device. The mounting mechanism may further include a high friction pad structure having an inner surface for attachment to one or more surfaces of the electronic device wherein an outer surface of the high friction pad structure contacts the ferrous surface when the electronic device is mounted to the ferrous surface. In addition, the mounting mechanism may further include a frame element attached to a non-ferrous surface, the frame element defining the ferrous surface.

The disclosure further pertains to a mounting mechanism for mounting an electronic device to a ferrous surface. The mounting mechanism includes a case structure having a high friction surface and a plurality of magnets embedded within the case structure. When the electronic device is mounted to the ferrous surface, the case structure at least partially encloses the electronic device and the high friction surface contacts the ferrous surface.

BRIEF DESCRIPTION OF THE DRAWINGS

FIG. 1A is an exploded perspective view of an electronic display device with a mounting mechanism, according to an embodiment.

FIG. 1B is a perspective view of the electronic display device with mounting mechanism of FIG. 1A.

FIG. 6A is a profile view of an electronic display device with a mounting mechanism, according to an embodiment including embedded magnets and frictional surface.

FIG. 6B is a back view of the embodiment of the electronic display device with mounting mechanism of FIG. 6A.

FIG. 7A is a profile view of an electronic display device with a mounting mechanism, according to another embodiment including embedded magnets and added friction pads.

FIG. 7B is a back view of the embodiment of the electronic display device with a mounting mechanism of FIG. 7A.

FIG. 8A is an exploded perspective view of an electronic display device with a mounting mechanism according to yet another embodiment, showing the electronic display device separated from a case with embedded magnets.

FIG. 8B is a perspective view of the electronic display device with mounting mechanism of FIG. 8B showing the electronic display device with a case with embedded magnets.

DETAILED DESCRIPTION

Figure 2B:
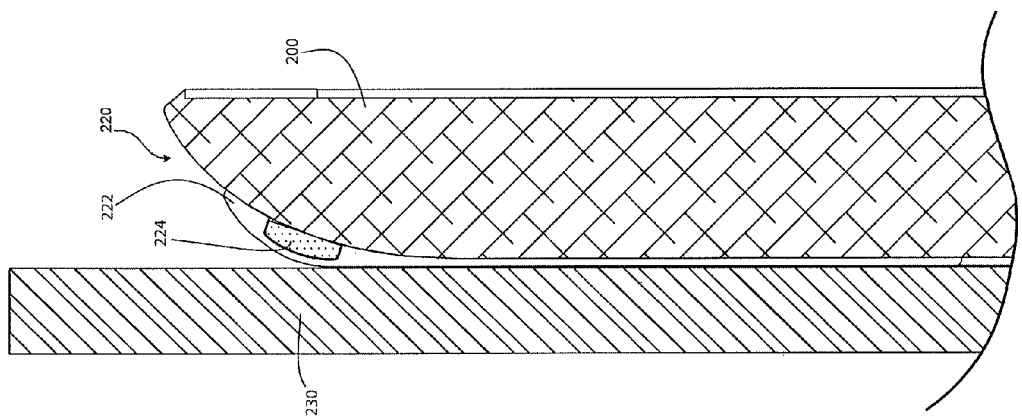
FIG. 2B is a cross-sectional profile view of a portion of the electronic display device with mounting mechanism of FIG. 2A shown mounted to a ferrous surface.

Devices and methods for a mounting mechanism for an electronic display device to mount the electronic display device to various surfaces are described herein. In some embodiments, an electronic display device includes a mounting mechanism that can include friction pads and magnets attached to a back side of the electronic display device. The friction pads and magnets can be used to mount the electronic display device to a surface. In some embodiments, the magnets are embedded within the friction pads. In some embodiments, the electronic display device includes a friction material and the magnets are embedded within the material of the electronic display device. The mounting mechanism can also permit a user to easily dismount the electronic display device from the mounting surface. A mounting mechanism as described herein can be added to an electronic display device without adding significant thickness or weight to the electronic display device or the mounting surface.

FIG. 1A is an exploded perspective view of an electronic display device with a mounting mechanism according to an embodiment, and FIG. 1B shows a perspective view of the mounting mechanism coupled to the electronic display device. An electronic display device 100 includes a mounting mechanism 120 coupled to a back side of the electronic display device 100. The mounting mechanism 120 can be used to mount the electronic display device 100 to a surface. The electronic display device 100 can be, for example, a tablet computer, a smartphone, a television, or an LCD display. In some embodiments, the electronic display device 100 can be an Apple iPad 2. The mounting mechanism 120 includes a pair of high friction pads 122, and multiple magnets 124 (as shown in FIG. 1A). The magnets 124 can be made from, for example, rare earth materials. The high friction pads 122 can be formed with, for example, a high friction material. For example, the high friction pads 122 can be made from an elastomeric material, such as, for example, silicone rubber. The magnets 124 can be positioned in such a way that they do not add significant thickness to the electronic display device 100 (see, e.g., FIGS. 2A and 2B). In some embodiments, the magnets 124 can be coupled to the electronic display device 100 with, for example, a double-sided tape. Other attachment methods such as adhesives, mechanical latches, hinges, or elastic grip can alternatively be used.

High friction material of the pads 122 in combination with the magnets 124 allows the electronic display device 100 to be mounted magnetically to ferrous surfaces and ferrous objects. When mounted to a ferrous surface as shown in FIG. 3A, each high friction pad 122 can be squeezed between the electronic display device 100 and the ferrous surface by the magnetic force of the magnets 124 to the ferrous surface.

Figure 2A:
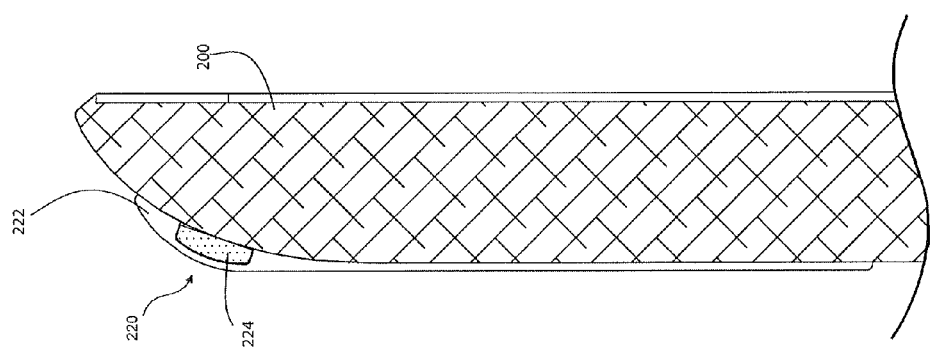
FIG. 2A is a cross-sectional profile view of a portion of an electronic display device with a mounting mechanism, according to another embodiment.

FIGS. 2A and 2B illustrate another embodiment of an electronic display device 200 with a mounting mechanism 220 that includes friction pads 222 and magnets 224 that can be formed the same as or similar to friction pads 122 and magnets 124, respectively. In this embodiment, the magnets 224 are embedded in the friction pads 222 as shown in FIGS. 2A and 2B. FIG. 2B shows a cross sectional view illustrating the contact between a ferrous surface 230, the pads 222, and the electronic display device 200.

Figure 3B:
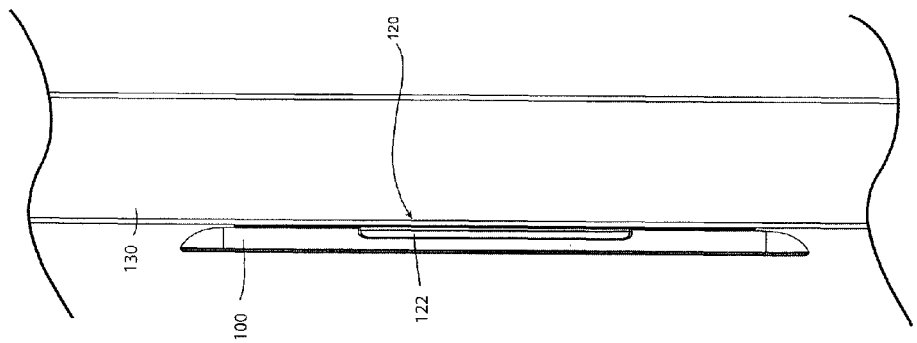
FIG. 3B is a profile view of the electronic display device of FIGS. 1A and 1B shown mounted to a ferrous surface.
Figure 3A:
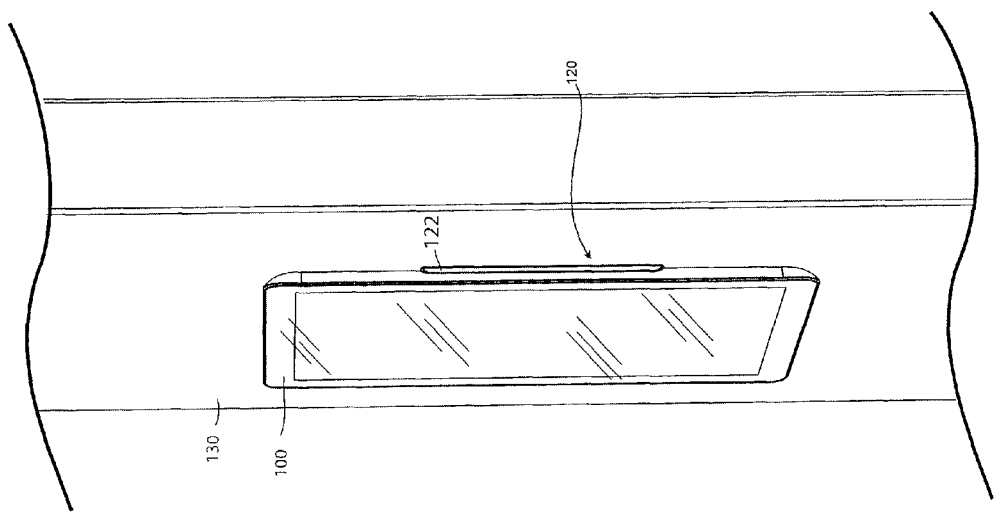
FIG. 3A is a perspective view of the electronic display device of FIGS. 1A and 1B shown mounted to a ferrous surface.

As shown in FIGS. 3A and 3B, the electronic display device 100 can be attached to a surface 130 and the force of friction from the pads 124 can maintain the electronic display device 100 attached to the surface 130. This force of friction can be proportional to the normal force and friction coefficient of the materials. The normal force is the magnetic pull force between the magnets 124 and the ferrous surface 130. This normal force, in addition to the high friction coefficient of the pads 122 produces an overall force of friction high enough to hold the electronic display device 100 in place, mounted to the ferrous surface 130. Electronic display device 200 can be mounted to a surface (e.g., surface 230 in FIG. 2B) in a similar manner as described for electronic display device 100.

Figure 4A:
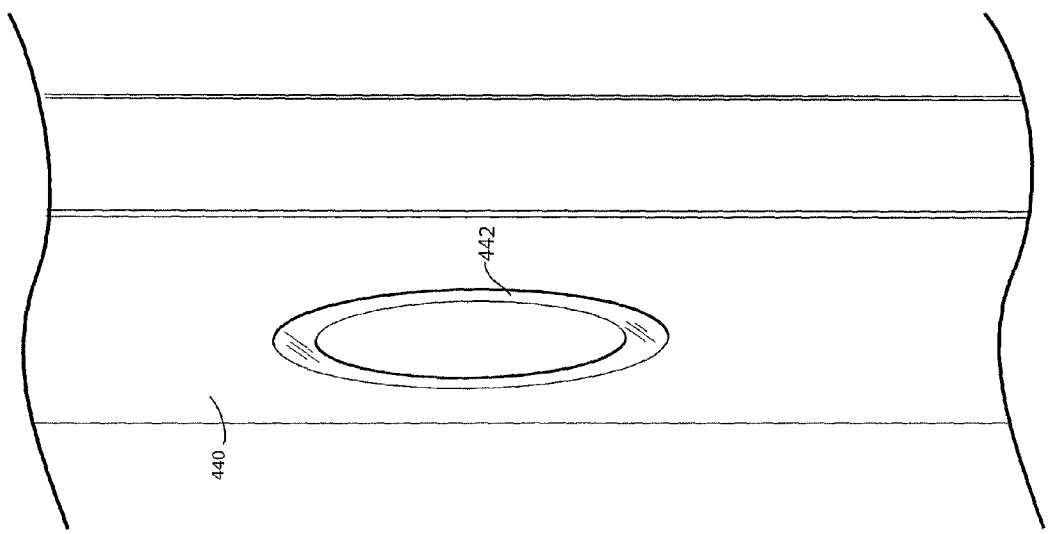
FIG. 4A is a perspective view of a ferrous element attached to a non-ferrous surface.
Figure 4C:
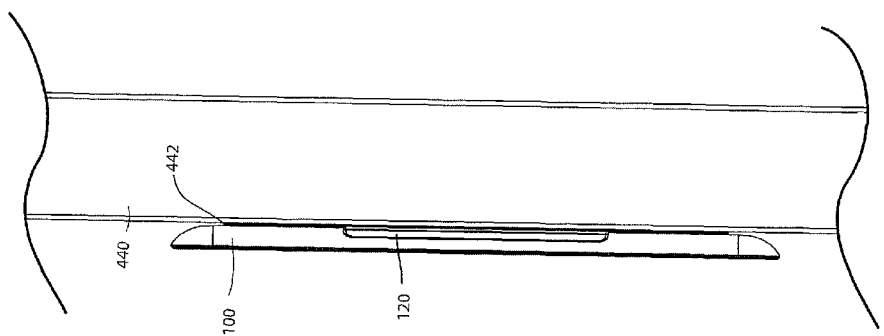
FIG. 4C is a profile view of the electronic display device of FIGS. 1A and 1B mounted to a non-ferrous surface using the ferrous element of FIG. 4A.
Figure 4B:
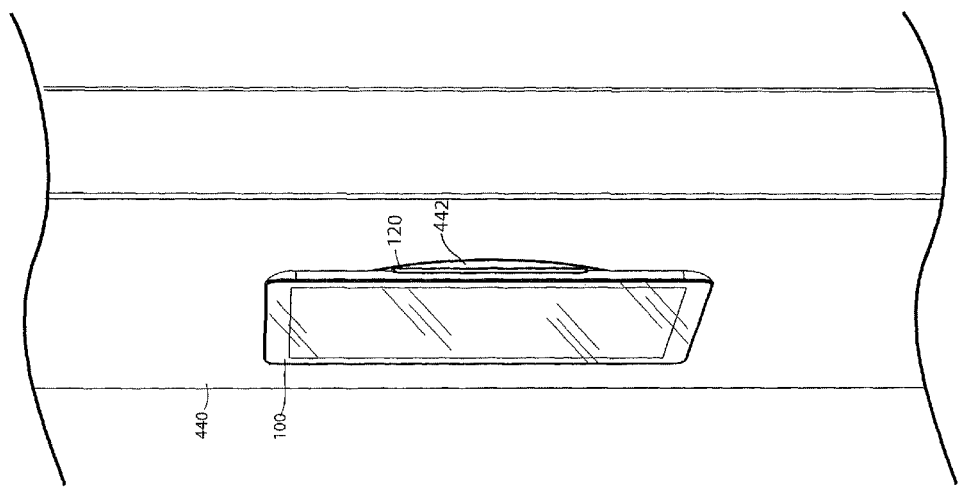
FIG. 4B is a perspective view of the electronic display device of FIGS. 1A and 1B mounted to a non-ferrous surface using the ferrous element of FIG. 4A.

FIG. 4B shows a perspective view and FIG. 4C shows a side view of the electronic display device 100 mounted to a non-ferrous surface 440. In this embodiment, a ferrous metal frame 442 (also referred to as "ferrous element") can be attached to the surface 440, as shown in FIG. 4A. In some embodiments, the metal frame 442 can be formed with a steel, such as, for example, a Stainless Steel—Grade 430, and the metal frame 442 can be adhered to the wall surface 440 with, for example, a double-sided tape (not shown). Other methods of attaching the metal frame 442 to a surface can be used such as adhesives, screws, or Velcro. FIG. 4C shows a profile view of the electronic display device 100 attached to surface 440 with the mounting mechanism 120 mounted to the ferrous metal frame 442, which is attached to the wall surface 440. In this embodiment, the pads 122 of mounting mechanism 120 can be squeezed between the electronic display device 100 and the metal frame 442 creating a friction force sufficient to keep the electronic display device 100 mounted to the non-ferrous surface 440.

Figure 5A:
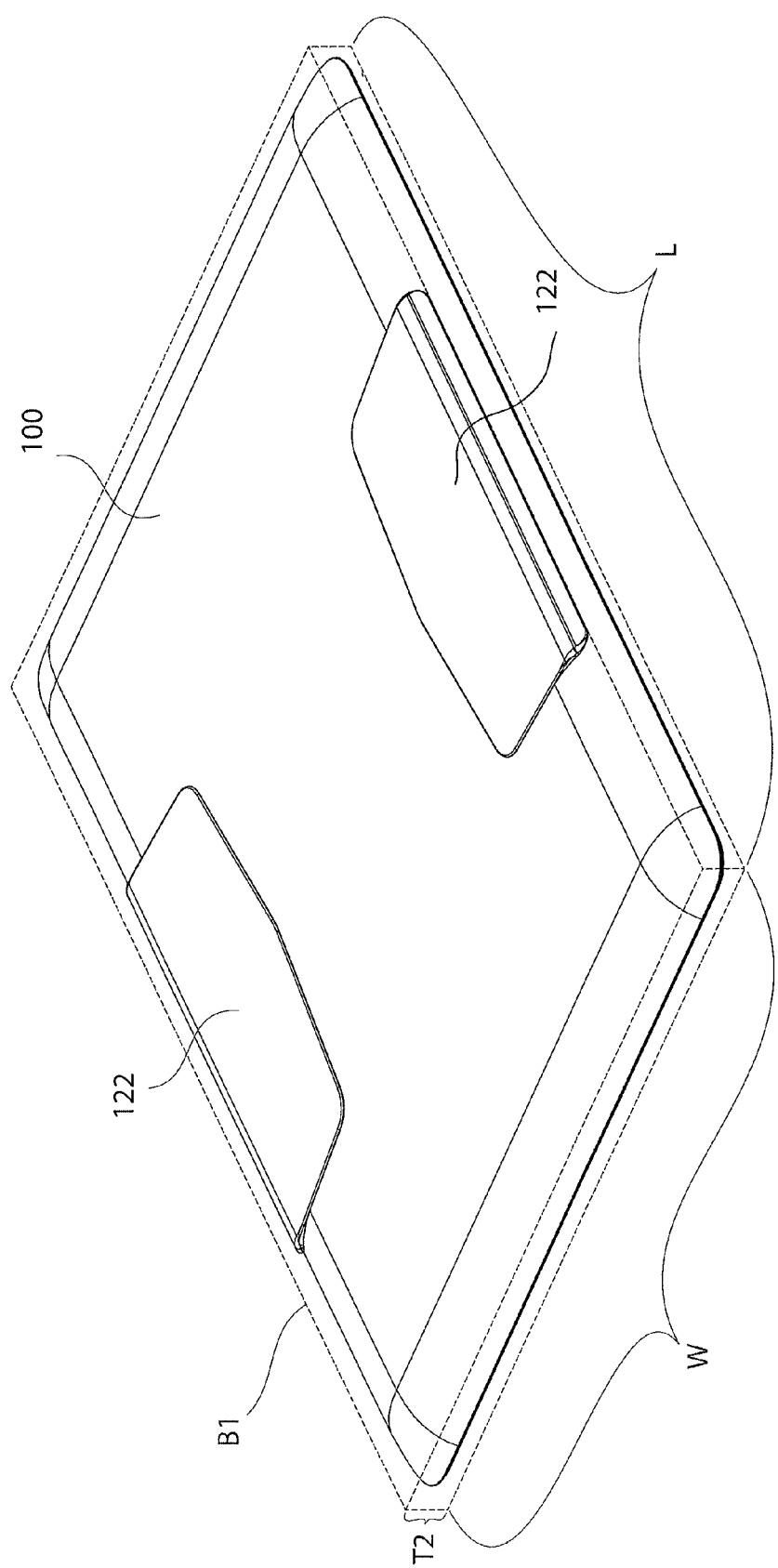
FIG. 5A is a perspective view of the electronic display device with mounting mechanism of FIGS. 1A and 1B illustrating example dimensions of the electronic display device with the mounting mechanism attached thereto.
Figure 5B:
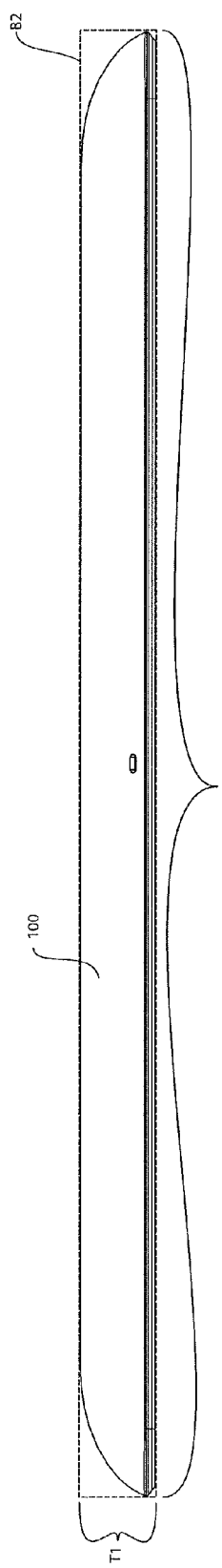
FIG. 5B is a top view of the electronic display device of FIGS. 1A and 1B, illustrating example dimensions of the electronic display device.
Figure 5C:
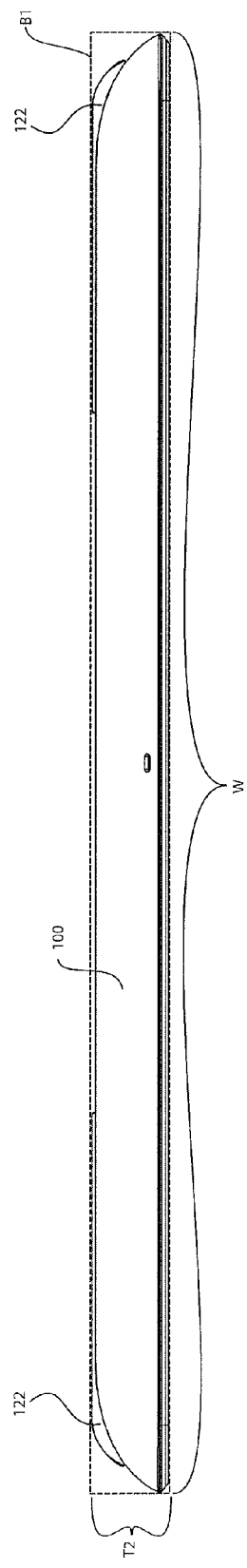
FIG. 5C is a top view of the electronic display device with mounting mechanism of FIGS. 1A and 1B illustrating example dimensions of the electronic display device with the mounting mechanism coupled thereto.

The mounting mechanisms described herein can provide a method of attaching an electronic display device to a surface while providing a low profile. In other words, when adhered to the surface, the mounting mechanism does not add significant thickness to the electronic display device. FIG. 5A shows a perspective view of the electronic display device 100 with the mounting mechanism 120 attached to the backside of the electronic display device 100 and shown within a dashed-line bounding box B1 to illustrate the dimensions of the electronic display device 100 with the mounting mechanism 120 attached thereto. The dimensions of the bounding box B1 are represented by the maximum length L, width W, and thickness T2. The thickness T2 is the total thickness of the electronic display device 100 and the mounting mechanism 120 attached thereto as shown in FIG. 5C. FIG. 5B shows a dashed-line bounding box B2, with the thickness of only the electronic display device 100 as T1. In one embodiment, shown in FIG. 5C, the thickness T2 of the combined electronic display device 100 and the mounting mechanism 120 is no greater than 10% thicker than the thickness T1 (FIG. 5B) of the electronic display device 100 alone. The width W of the electronic display device 100 remains unchanged. As shown for example, in FIG. 4C, in embodiments in which the metal frame 442 is used, the stack up thickness of the electronic display device 100, the mounting mechanism 120 and the metal frame 442 does not increase the overall thickness of the electronic display device 100 by more than 15% of the thickness of the electronic display device alone.

In another embodiment shown in FIGS. 6A and 6B, an electronic display device includes a mounting mechanism 620 that includes multiple magnets 624 that are embedded into the electronic display device 600. The back surface of the electronic display device 600 can have, for example, high friction properties. The combination of the high friction surface of the electronic display device 600 and the embedded magnets 624 can allow the electronic display device 600 to mount magnetically to ferrous surfaces and ferrous objects.

In another embodiment shown in FIGS. 7A and 7B, an electronic display device 700 with a mounting mechanism 720 includes multiple magnets 724 that are embedded into the electronic display device 700. Pads 722 composed of high friction material are attached externally to the electronic display device 700 such that the combination of the magnets 724 and the pads 722 allows the electronic display device 700 to be mounted magnetically to ferrous surfaces and ferrous objects. In this embodiment, the friction pads 722 add a thickness to the electronic display device 700 that is no more than 10% greater than the thickness of the electronic display device 700 alone.

In yet another embodiment, an electronic display device 800 includes a mounting mechanism that can be in the form of a case that can enclose the electronic display device 800. FIG. 8A shows a layered perspective view of the electronic display device 800 and a case 845. The case 845 can be made of, for example, a high friction material. Embedded into the walls of the case 845 are multiple magnets 824. The combination of the high friction material of the case 845 and the embedded magnets 824 allows the electronic display device 800 to be mounted magnetically to ferrous surfaces and ferrous objects. FIG. 8B shows a perspective view of the electronic display device 800 with the mounting mechanism 820 (in the form of case 845) coupled thereto.

Figure 9B:
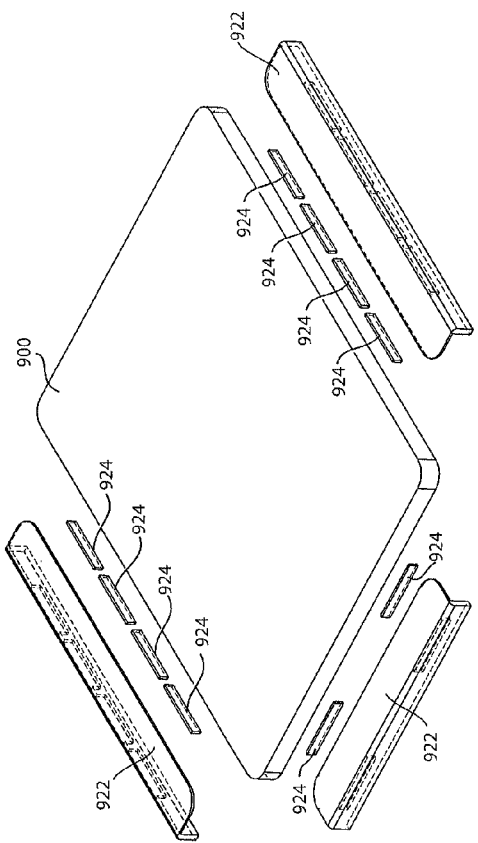
FIG. 9B is an exploded perspective view of the electronic display device and the mounting mechanism of FIG. 9B.
Figure 9A:
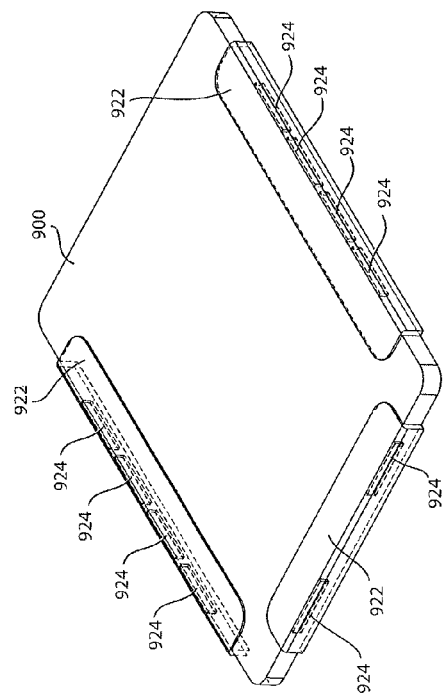
FIG. 9A is a perspective view of an electronic display device with a mounting mechanism, according to yet another embodiment, with friction pads and magnets aligned to the sides of the electronic display device.

FIGS. 9A and 9B illustrate yet another embodiment of an electronic display device 900 with a mounting mechanism 920. The mounting mechanism 920 includes high friction pads 922 with multiple magnets 924 that align to the sides of the electronic display device 900. FIG. 9B shows an exploded perspective view and FIG. 9A illustrates the mounting mechanism 920 coupled to the electronic display device 900. The high friction pads 922 can be attached to the sides of the electronic display device 900 as shown in FIG. 9A. Magnets 924 can be positioned between the electronic display device 900 and the friction pads 922. The high friction pads 922 extend to the back side of the electronic display device 900 to ensure contact of the pads 922 with the surface to which the electronic display device 900 is mounted. The combination of the high friction pads 922 that extend to the back of the electronic display device 900 and the magnets 924 allows the electronic display device 900 to be mounted magnetically to ferrous surfaces and ferrous objects.

Figure 10B:
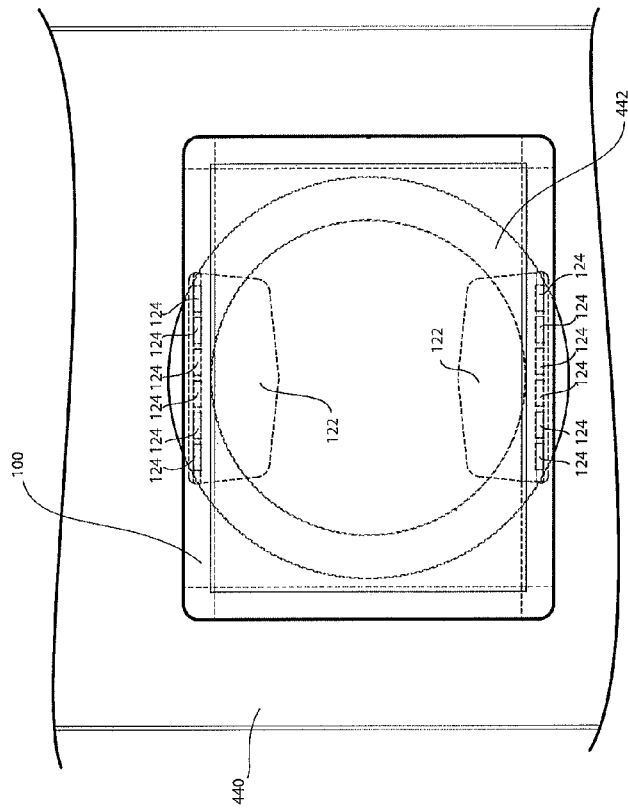
FIG. 10B is a front transparent view of the electronic display device with mounting mechanism of FIG. 10A, shown mounted to a non-ferrous surface in a landscape orientation using a ferrous element.
Figure 10A:
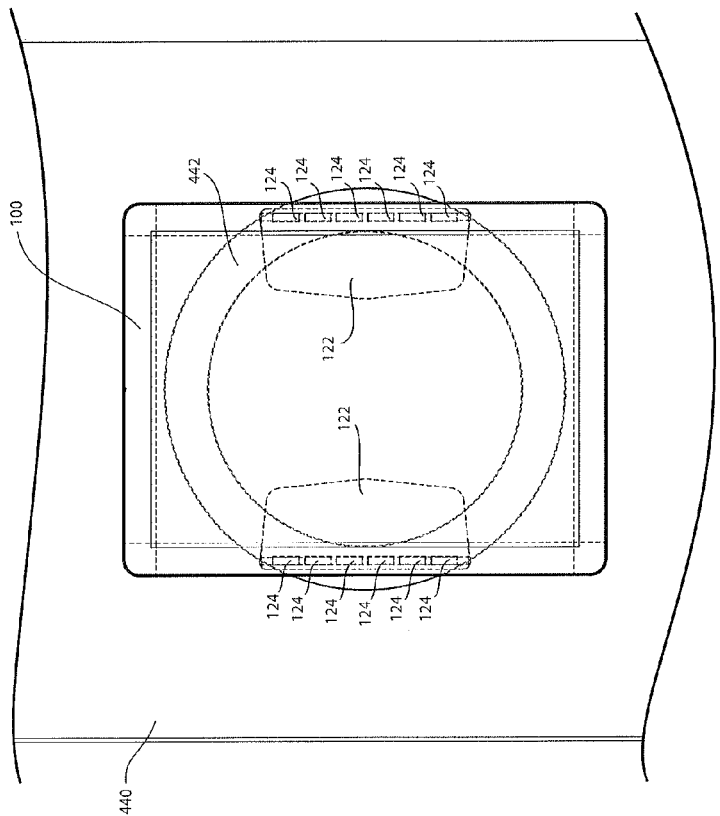
FIG. 10A is a front transparent view of the electronic display device with mounting mechanism of FIGS. 1A and 1B, shown mounted to a non-ferrous surface in a portrait orientation using a ferrous element.

In each of the embodiments described above, the electronic display device 100, 200, 600, 700, 800, 900 can be mounted to a surface in various orientations, such as, in a landscape view, a portrait view or at any angle therebetween. For example, FIG. 10A shows a transparent back view of the electronic display device 100 mounted in portrait view to the non-ferrous surface 440 with the ferrous metal frame 442 and mounting mechanism 120. FIG. 10B shows a transparent back view of the electronic display device 100 mounted in landscape view to the non-ferrous surface 440 with the ferrous metal frame 442 and the mounting mechanism 120.

While various embodiments have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above.

Where schematics and/or embodiments described above indicate certain components arranged in certain orientations or positions, the arrangement of components may be modified. While the embodiments have been particularly shown and described, it will be understood that various changes in form and details may be made. Any portion of the apparatus and/or methods described herein may be combined in any combination, except mutually exclusive combinations. The embodiments described herein can include various combinations and/or sub-combinations of the functions, components, and/or features of the different embodiments described.

What is claimed is:

1. A mounting mechanism for mounting an electronic device to a ferrous surface, the mounting mechanism comprising:
   a high friction pad structure having an inner surface disposed to be attached to a surface of the electronic device and an outer surface disposed to be attached to the ferrous surface, the high friction pad structure including a planar portion and a tapered portion defined by the inner surface, the planar portion being parallel to the outer surface and the tapered portion being nonparallel to the outer surface and having a thickness greater than the planar portion; and
   a plurality of magnets embedded only within the tapered portion of a perimeter of the high friction pad structure;
   wherein an outer surface of the high friction pad structure contacts the ferrous surface when the electronic device is mounted to the ferrous surface.

2. The mounting mechanism of claim 1 further including a frame element for attachment to a non-ferrous surface, the frame element defining the ferrous surface.

3. The mounting mechanism of claim 1 wherein the high friction pad structure includes a first section and a second section separated from the first section, a first subset of the plurality of magnets being embedded within the first section and a second subset of the plurality of magnets being embedded within the second section.

4. The mounting mechanism of claim 1, wherein the electronic device is of a first thickness and the mounting mechanism is of a second thickness wherein the sum of the first thickness and the second thickness is no more than 10% greater than the first thickness.

5. The mounting mechanism of claim 1, wherein the plurality of magnets are made from rare earth materials.

6. The mounting mechanism of claim 1, further comprising:
   an adhesive disposed on a portion of the inner surface of the high friction pad structure.

7. The mounting mechanism of claim 6, wherein the adhesive is a double-sided tape.

8. A low profile magnetic mounting mechanism for mounting an electronic device to a surface, the mounting mechanism comprising:
   a high friction pad structure including a first section and a second section separated from the first section, the first section and the second section each having an inner surface disposed to be attached to a back surface of the electronic device and an outer surface disposed to be attached to a ferrous surface, the high friction pad structure including a planar portion and a tapered portion defined by the inner surface, the planar portion being parallel to the outer surface and the tapered portion being nonparallel to the outer surface and having a thickness greater than the planar portion; and
   a plurality of magnets disposed to be at least one of embedded within the high friction pad structure and attached to a surface of the electronic device;
   wherein the back surface of the electronic device includes a tapered portion extending to a perimeter of the electronic device,
   wherein the first section covering a first subset of the plurality of magnets disposed only within the tapered portion of the first section and the second section covering a second subset of the plurality of magnets disposed only within the tapered portion of the second section, the high friction pad structure covering the plurality of magnets when attached to the surface of the electronic device.

9. The mounting mechanism of claim 8 further including a frame element for attachment to a non-ferrous surface, the frame element defining the ferrous surface.

10. The mounting mechanism of claim 8, wherein the wherein the electronic device is of a first thickness and the mounting mechanism is of a second thickness wherein the sum of the first thickness and the second thickness is no more than 10% greater than the first thickness when the high friction pad structure is attached to the back surface of the electronic device, and
    wherein an outer surface of the high friction pad structure contacts a ferrous surface when the electronic device is mounted to the ferrous surface.

11. The mounting mechanism of claim 8, wherein the plurality of magnets are made from rare earth materials.

12. The mounting mechanism of claim 8, further comprising:
    an adhesive disposed on a portion of the inner surface of the high friction pad structure.

13. The mounting mechanism of claim 12, wherein the adhesive is a double-sided tape.

* * * * *